April 9, 1935.  L. A. HYLAND ET AL  1,996,869

SIGNALING APPARATUS AND METHOD OF USING THE SAME

Filed Oct. 6, 1931  2 Sheets-Sheet 1

INVENTOR
Lawrence A. Hyland
BY Malcolm P. Hanson

ATTORNEY

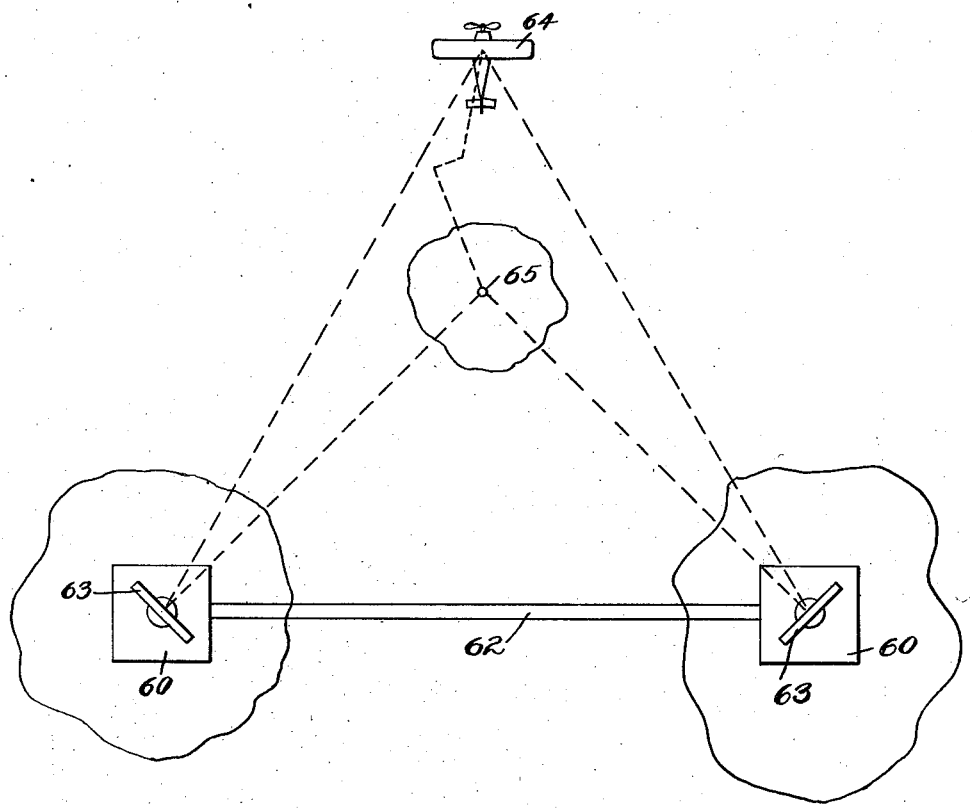
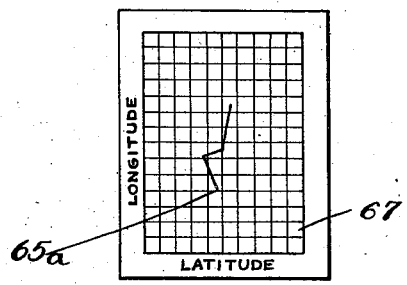

Patented Apr. 9, 1935

1,996,869

UNITED STATES PATENT OFFICE 1,996,869

SIGNALING APPARATUS AND METHOD OF USING THE SAME

Lawrence A. Hyland and Malcolm P. Hanson, Washington, D. C.

Application October 6, 1931, Serial No. 567,248

16 Claims. (Cl. 250—11)

(Filed but not issued under the act of March 3, 1883, as amended April 30, 1928; 370 O. G. 757)

Our invention relates to a method of and apparatus for transmitting signals from aircraft and other vessels, and to the imparting of other information than that which such signals themselves may literally mean, which signals may be merely the regularly assigned station call of such craft, or any other prearranged signal.

Heretofore it has been very difficult, if not impossible, when the operator must be engaged at protracted tasks more vital than operating the wireless apparatus, to locate such craft when out of sight or to know whether the same is still proceeding under control and, if so, at what speed; but with our invention for automatically transmitting said signals all this and other desirable information is continuously available to persons at distant points.

Such continuously received signals may be utilized by one or more direction finder stations for the purpose of determining the position of said aircraft.

Furthermore, since the signals are transmitted at a sending speed which is proportionate to the air speed of the craft, the rate of the reception of the signals, with the known currents encountered by the craft, enables the ground speed of said craft to be substantially determined at distant points, and at the same time such signals convey the information, vital with airplanes, that such craft is navigating. When such craft is upon an expedition to either pole or some other seldom traveled or other hazardous distant place, such automatically transmitted information is of great importance.

By driving the signal transmitting means directly from the air encountered in the navigation of said craft, rather than by a prime mover on the craft, the signals will definitely determine the ground speed of said craft since the air currents are charted and ascertainable at a distance, while the speed of said prime mover may vary due to local conditions unknown at a distance. The cessation of said signals indicates that the aircraft is no longer in the air. From the time at which the signals cease it may be known whether or not the aircraft could have arrived at its destination. If not, the cessation indicates a forced landing. The character of the signals just prior to their cessation will give important information as to the nature of the forced landing; thus, if the sending speed gradually decreases before the signals cease, a gradual reduction in air speed is indicated which in turn indicates that the aircraft has been landed under control. If on the other hand, there has been a marked increase in the sending speed followed by a cessation, it indicates that, just prior to the landing, there was a marked increase in air speed, as in a dive or spin, and therefore that the aircraft has landed out of control.

It will therefore be apparent that by our invention in which a series of signals is automatically transmitted or repeated at a rate which is proportionate to the air speed of the craft, much information which has not heretofore been available may be gained therefrom with the aid of other known data. Such information is thus made more continuous, uniform and reliable than was heretofore possible when the signals were transmitted only by manual operation, since our invention is independent of the ability or availability of the radio operator of the aircraft.

It will also be apparent that our method of transmitting signals at a rate which is proportionate to the air speed of the craft may be performed by any of many kinds of apparatus; and that our invention is entitled to broad interpretation and a wide range of equivalents; and that substantial changes may be made therein without departure from our invention or the scope and character of the appended claims.

In the drawings illustrating our invention, and in which like characters of reference indicate the same parts:—

Fig. 3 is a diagrammatic view of a portion of the course of the vessel and of the signal receiving stations and their relative preferred locations; and Fig. 4 is a view of a chart whereon may be recorded the course of the vessel.

Figure 2:
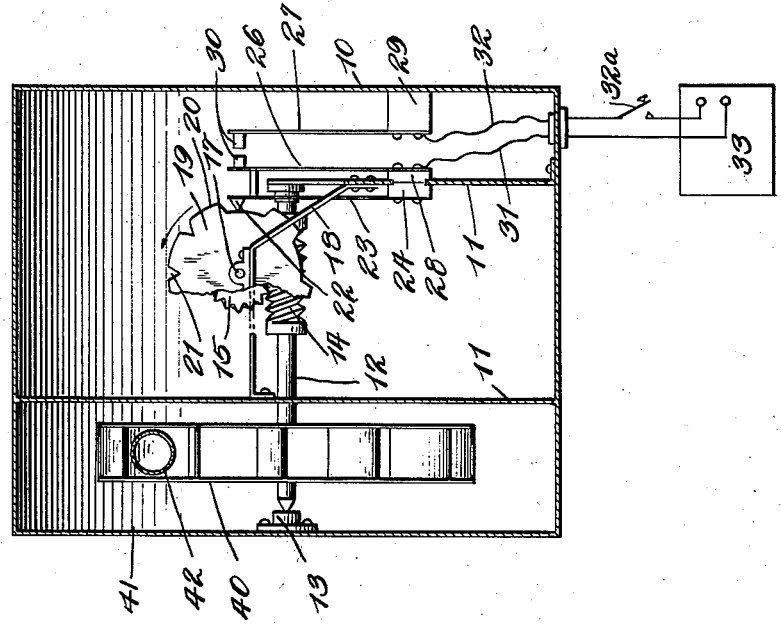
Fig. 2 is a sectional view on line 2—2 of Fig. 1 with portions of the selective signal wheel being broken away for clearness.
Figure 1:
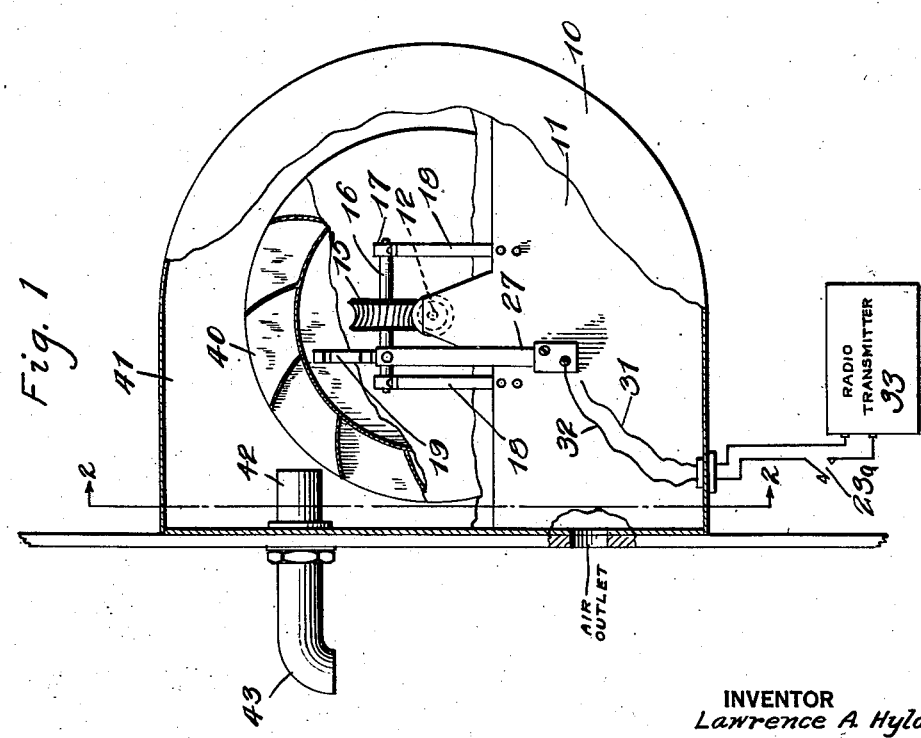
Fig. 1 is a front elevation view of an apparatus embodying our invention, parts of the casing and the turbine wheel being broken away for clearness.

In the drawings 10 is an outer casing in which are spaced frame members 11 secured thereto. Between one of members 11 and the outer casing is a shaft 12 provided with a cone bearing on each end engaging in conical bearing seats 13 secured to member 11 and casing 10. On shaft 12 is a worm 14 meshing with worm-wheel 15 fixed on shaft 16 provided with bearings 17 in hangers 18 secured to members 11. On said shaft 16 is a signal wheel 19 whose periphery is provided with alternate projections 20 and notches 21 which cooperate, on the revolution of wheel 19, with a preferably V-shaped projection 22 on key 23 that is movably mounted upon member 11 and insulated therefrom by member 24. Key 23 is provided with a preferably rigid projection 25 whose end is adapted to contact with one of a pair of normally separated make-and-break contact members 26 and 27 respectively mounted upon insulated members 28 and 29 respectively secured to the adjacent member 11 and to the casing 10. Each of said members 23, 26 and 27 are movable, preferably by being formed of spring metal and rigidly secured at one of their ends to their respective insulating members 24, 28 and 29, in which instance said contact members are each provided with a contact head 30. Heads 30 are normally separated from each other when projection 22 of key 23 is in a notch 21 of signal wheel 19, and to be maintained in contact with each other while projection 22 is riding upon a projection 20 of wheel 19. Members 26 and 27 are electrically connected, respectively by wires 31 and 32 adapted to form the key circuit of the radio signal sending apparatus of any desirable form represented as 33 in Fig. 1.

When signal wheel 19 is rotated in any desirable manner, apparatus 33 will be thereby caused to transmit signals represented by the relative association and extent of each of projections 20 and notches 21 on wheel 19.

It will be understood that while the best form of the signal member we have found, from the aspect of repetition of the signals, is a wheel, yet broadly the same may be provided in any other form, which with its key may be relatively moved in any desirable manner, without departure from the spirit of our invention.

While a skillful operator may manually transmit or repeat signals at a rate which is substantially proportionate to the speed of the craft, yet the same may be more reliably performed with uniform accuracy by any of many different kinds of apparatus, one form of which apparatus will be herein fully described to indicate that the method and the various steps thereof are practical and useful and how they may be most relatedly and dependently practiced.

Inasmuch as the currents of the medium in which the vessel is navigating are generally known, or readily ascertainable, and the motor speed of such vessel may vary from causes unknowable and unascertainable at a distance, we have found that our method attains the most accurate and efficient results when signals are transmitted or repeated at a rate which is proportionate to the relative speed of the vessel through the medium in which it is navigating; and that the same gives satisfactory results by transmitting the signals utilizing the force and the relative velocity of the medium in which said vessel is navigating, whether the medium be air or water.

This step of our method we have found to be most satisfactorily practiced by the means of a turbine 40 adapted to be rotated by the force of and proportionate to the relative velocity of the medium in which the vessel is navigating together with suitable means for imparting such rotation to signal wheel 19.

The means which we have provided for originating the signals in the instance shown in the drawings, consists of the turbine 40 within casing 10 secured to shaft 12 in a housing 41 in one end of casing 10 and separate from the other mechanism contained in the casing. Through one wall of casing 10 and extending into housing 41, in proximity to the vanes of turbine 40, is one end of a conduit 42 whose opposite end extends into, and is adapted to receive and transmit to the turbine as a motive fluid, the medium in which the vessel is navigating, which medium may be so received by a hood or elbow 43 upon the opposite or outer end of conduit 42, while the spent medium received and transmitted to the turbine by conduit 42 is discharged from housing 41 by opening 44 in casing 10.

The rotation of turbine 40 is transmitted to signal wheel 19 by means of the gearing 14 and 15 heretofore described.

It will also be understood that any convenient means may be employed, other than the form of key 23 and members 26 and 27 shown in the drawings, for the transmission of the signals with which the signal means 19 is provided, without departure from the scope of the broader apparatus claims hereto appended.

In one of the wires 31 and 32, preferably 32, we provide a switch 32a which, when open, prevents the turbine-driven apparatus from sending any signal, so that at such times the wireless apparatus on the vessel may be used for the transmission of dispatches.

The continuous automatically transmitted or repeated signals of the vessel may be received by a plurality of wireless receiving stations 60, Fig. 3, located at known angles to each other and at known distances apart, and each connected with each other by independent communication systems diagrammatically represented by wires 62, although no wires may be necessary therefor. Each of stations 60 is equipped with means, diagrammatically represented by 63, for ascertaining the direction from which wireless signals are received. Said instrumentalities 60, 62 and 63 are each of known types, and are availed of by us in the practice of our invention to the best and most complete advantage and in the attainment of the great accuracy of its primary results, as well as in obtaining the most advantage from the additional information which signals from the vessel may impart.

In important cruises the vessel, which may be indicated as 64, and which, in Fig. 3 for example, is shown as an aircraft, may be scheduled to start at a given time from point 65, in which case the direction finders 63 will at such time be trained upon said point 65, which point usually is located so remotely that it may not be seen from any of the stations 60. In other cases finders 63, or a plurality of them, for instance, first pick up the automatic signal as transmitted from point 65, and finders 63 are shifted to follow the successive points in the navigation of vessel 64 from which the continuous signal is transmitted. The course of the vessel between its starting point 65, or point from which its first message was received, to its indicated position being shown in dotted lines in Fig. 3, the further course of the vessel having to be charted in one or all of stations 60 or at some separate point which may be remote from each or any of the stations. The angle at which each of the stations 60 receives the signal transmitted by vessel 64, and any peculiarity of the received message, is transmitted to and between stations 60, so that from the known distances and angles between stations 60 and the different angles at which each receives the signals from vessel 64, its course and other data pertaining to its navigation may be charted at each of the stations, or at some separate point likewise in communication with one or all of stations 60, at each of which are data of the known currents encountered by the vessel, and to which are transmitted weather reports and other pertinent information.

The transmission or repetition of the signal automatically at a rate proportionate to the relative speed of the vessel 64, when received by a single station 60, when associated with data of the currents encountered by the vessel gives substantially accurate information as to the travel speed of the vessel. When signals are received by a plurality of stations 60, of known angles and distances apart, the successive differences in the angles at which each of stations 60 receives the signals when associated with the element of elapsed time and the known angles and distances between stations 60 enables the travel speed of the vessel to be accurately and readily determined.

This automatic signal transmission may also impart other information which those skilled in the art may, with a little practice, apply most readily and substantially unerringly.

In thus charting the course of the vessel from the continuously automatically transmitted signals by one or all of the receiving stations, or at a separate point, the same is marked progressively upon a suitably ruled charting sheet 67, Fig. 4, commencing with the starting point 65a and continuing throughout the navigation of said vessel.

It will thus be apparent that this invention is of substantial breadth and scope and entitled to corresponding wide range of equivalents and breadth of interpretation.

The invention herein described may be manufactured and used by or for the Government of the United States of America for governmental purposes without the payment to us of any royalty thereon or therefor.

We claim:

1. In a method of continuously charting the course of a vessel from a distance, the step of substantially continuously transmitting a signal from said vessel at a rate proportional to the speed of the vessel in the medium through which it is moving.

2. In a method of determining the speed of a vessel from a distance, the step of transmitting a signal from said vessel at a definite known rate proportional to the relative speed of said vessel in the medium in which it is moving.

3. In a method of continuously charting the course of a vessel from a distance, the steps of substantially continuously transmitting signals from said vessel at a known rate proportional to the speed of said vessel relative to its medium, substantially continuously receiving said signals at a point, substantially continuously determining the angles at which said point receives the successive signals, computing from said speed, angles and time the positions of said vessel and recording the results on a chart.

4. In a method of determining from a distance data concerning the navigation of a vessel, the steps of substantially continuously transmitting signals from said vessel at a known rate proportional to the speed of said vessel relative to its medium, receiving said signals at a point, and determining the angle at which said point receives said signals.

5. In a method of determining from a distance data concerning the navigation of a vessel, the steps of transmitting signals from said vessel at a known rate proportional to the speed of said vessel relative to its medium, and receiving said signals at a distant point.

6. In an apparatus for charting the course of a vessel from a distance, means for substantially continuously transmitting a signal from said vessel at a rate proportional to the speed of the vessel in the medium through which it is moving, means for substantially continuously receiving said signals at a plurality of points remote from said vessel and of known distance apart, means at each of said points for determining the angles at which said signal is received, means whereby said information may be communicated between said points, and a chart whereon the course of said vessel may be indicated when determined with the aid of said information received at said points.

7. In an apparatus for charting the course of a vessel from a distance, means for transmitting a signal from said vessel at a rate proportional to the speed of the vessel in the medium through which it is moving, means whereby said first mentioned means may be substantially continuously driven, means whereby said signal may be substantially continuously received at a plurality of stations remote from said vessel and of known distance apart and in known directional relation, means at each of said stations for determining the angles at which said signal is received, means whereby said information may be communicated between said stations, and a chart whereon the course of said vessel may be indicated when determined with the aid of said information received at said distance.

8. In an apparatus for obtaining data regarding a vessel at a distance, means for transmitting a signal from said vessel, means whereby said means may be substantially continuously driven at a known rate proportional to the speed of said vessel relative to its medium, means whereby said signals may be received at a distant station, and means at said station for determining the direction from which said signal is received.

9. In an apparatus for signaling from a moving craft, a housing mounted thereon, a turbine rotatably mounted in said housing, means to direct a stream of the medium through which said craft is moving upon said turbine, a worm gear operatively connected to said turbine, a gear element meshed with said worm gear, a shaft on which said gear element is mounted, a wheel whereof the periphery has cut out portions mounted on the said shaft, a resiliently mounted follower disposed to contact the said periphery, a contact element connected to the mounting of said follower, a second contact element disposed adjacent the first mentioned contact element, a radio broadcasting device, and means forming separate electrical connections from said contact elements to said device.

10. In an apparatus for charting the course of a vessel from a distance, means for substantially continuously transmitting a signal from said vessel, signal-rate controlling means for said transmitting means driven by the medium through which the vessel is moving at a rate proportional to such movement, means for substantially continuously receiving said signals at a plurality of points remote from said vessel and of known distance apart, means at each of said points for determining the angles at which said signal is received, means whereby said information may be communicated between said points, and a chart whereon the course of said vessel may be recorded when determined with the aid of said information received at said points.

11. In an apparatus for charting the course of a vessel from a distance, means for transmitting a signal from said vessel, means whereby said first mentioned means may be substantially continuously driven by the medium through which said vessel is moving at a rate proportional to such movement, means whereby said signal may be substantially continuously received at a plurality of stations remote from said vessel and of known distance apart and in known directional relation, means at each of said stations for determining the angles at which said signal is received, means whereby said information may be communicated between said stations, and a chart whereon the course of said vessel may be recorded when determined with the aid of said information received at said stations.

12. In a method of continuously charting the course of a vessel from a distance, the steps of transmitting a substantially continuous signal from said vessel during its navigation at a rate proportional to the movement of said vessel, substantially continuously receiving said signals at a plurality of points of known distance apart, substantially continuously determining the angle at which each of said points receives the successive signals, substantially continuously utilizing said angles and said known distances and thereby determining the location of the point from which said signals were transmitted, substantially continuously intercommunicating said information between said receiving points, and at one or more of said receiving points substantially continuously charting the course of said vessel.

13. In a radio communication system, the method of observing relations between a moving object and a fixed observation station which comprises transmitting radio signals from said moving object; varying the character of said transmission in accord with one or more characteristics of the motion of said object; receiving said transmission from said moving object at an observation station; and interpreting or analyzing said variations in the received transmission in order to determine the characteristics represented thereby.

14. In a radio communication system, the method of observing relations between a moving object and a fixed observation station which comprises generating radio frequency oscillations at said moving object; modulating said radio frequency oscillations; varying the character of the modulation thereof in accord with a predetermined characteristic of the motion of said moving object to produce signals capable of interpretation; transmitting said signals from said moving object; receiving said transmitted signals at an observation station; and interpreting said received signals to determine the characteristics of motion represented thereby.

15. Method of observing relations between an aircraft in flight and an observation station on the ground, which comprises generating radio frequency oscillations on said aircraft, producing variations thereof in accord with the instantaneous speed of said aircraft to form signals capable of interpretation to determine the instantaneous speed, transmitting said signals from said aircraft, receiving said transmitted signals at an observation station on the ground, and interpreting said received signals to determine the instantaneous speed of said aircraft.

16. A radio communication system for aircraft, comprising, in combination, a radio transmitting system located on an aircraft, means located on said aircraft for varying one or more characteristics of the radio transmission from said transmitting system in accord with a desired phase of the motion of said aircraft, a radio receiving system for receiving said transmission, and means at said receiving station for interpreting or analyzing said received transmission in order to determine the characteristics represented by the variations thereof.

LAWRENCE A. HYLAND.
MALCOLM P. HANSON.